United States Patent
Kravitz

(10) Patent No.: US 9,430,620 B2
(45) Date of Patent: Aug. 30, 2016

(54) SYSTEM AND METHOD FOR SECURING THE LIFE-CYCLE OF USER DOMAIN RIGHTS OBJECTS

(71) Applicant: Google Technology Holdings LLC, Mountain View, CA (US)

(72) Inventor: David W. Kravitz, Fairfax, VA (US)

(73) Assignee: Google Technology Holdings LLC, Mountain View, CA (US)

( * ) Notice: Subject to any disclaimer, the term of this patent is extended or adjusted under 35 U.S.C. 154(b) by 93 days.

(21) Appl. No.: 14/551,772

(22) Filed: Nov. 24, 2014

(65) Prior Publication Data
US 2015/0121551 A1    Apr. 30, 2015

Related U.S. Application Data

(62) Division of application No. 12/477,104, filed on Jun. 2, 2009, now Pat. No. 8,925,096.

(51) Int. Cl.
| | | |
|---|---|---|
| G06F 17/30 | (2006.01) | |
| G06F 21/10 | (2013.01) | |
| H04L 29/06 | (2006.01) | |
| H04L 9/08 | (2006.01) | |

(Continued)

(52) U.S. Cl.
CPC .............. *G06F 21/10* (2013.01); *H04L 9/0822* (2013.01); *H04L 9/3247* (2013.01); *H04L 9/3263* (2013.01); *H04L 63/061* (2013.01); *H04L 63/0823* (2013.01); *G06F 2221/07* (2013.01); *G06F 2221/2107* (2013.01); *G06F 2221/2141* (2013.01); *G11B 20/00086* (2013.01); *G11B 20/00217* (2013.01); *H04L 2209/603* (2013.01); *H04L 2463/061* (2013.01); *H04L 2463/101* (2013.01)

(58) Field of Classification Search
CPC .................. H04L 2463/101; H04L 2463/061; H04L 2209/603; H04L 63/061; H04L 63/0823; H04L 9/3247; H04L 9/3263; G06F 221/07; G06F 221/2107; G06F 221/2141; G06F 21/10; G11B 20/00217; G11B 20/00086
USPC ....................... 726/2, 4, 31; 380/278; 705/54
See application file for complete search history.

(56) References Cited

U.S. PATENT DOCUMENTS 8,201,216 B2 *  6/2012  Cha .......................... G06F 21/10
                                                                707/708
8,205,071 B2    6/2012  Lee
(Continued)

OTHER PUBLICATIONS

OMA-TS-SCE DRM-V1 0-20081209-C (DRM Specification—SCE Extensions: Candidate Version 1.0—Dec. 9, 2008) retrieved Apr. 4, 2016 from http://technical.openmobilealliance.org/Technical/Release_Program/docs/SCE/V1_0-20081209-C/OMA-TS-SCE_DRM-V1_0-20081209-C.pdf.*

(Continued)

*Primary Examiner* — Brian Shaw
(74) *Attorney, Agent, or Firm* — Fenwick & West LLP

(57) ABSTRACT

In a method for enabling support for backwards compatibility in a User Domain, in one of a Rights Issuer (RI) and a Local Rights Manager (LRM), a Rights Object Encryption Key (REK) and encrypted REK are received from an entity that generated a User Domain Authorization for the one of the RI and the LRM and the REK is used to generate a User Domain Rights Object (RO) that includes the User Domain Authorization and the encrypted REK.

17 Claims, 7 Drawing Sheets

(51) Int. Cl.
*H04L 9/32* (2006.01)
*G11B 20/00* (2006.01)

(56) References Cited

U.S. PATENT DOCUMENTS

| | | |
|---|---|---|
| 2003/0126086 A1 | 7/2003 | Safadi |
| 2004/0019801 A1 | 1/2004 | Lindholm et al. |
| 2004/0062400 A1 | 4/2004 | Sovio et al. |
| 2004/0103312 A1 | 5/2004 | Messerges et al. |
| 2004/0133632 A1 | 7/2004 | Messerges et al. |
| 2005/0044361 A1 | 2/2005 | Chang et al. |
| 2005/0138400 A1 | 6/2005 | Wu et al. |
| 2006/0020784 A1 | 1/2006 | Jonker et al. |
| 2006/0190621 A1 | 8/2006 | Kamperman et al. |
| 2006/0282391 A1 | 12/2006 | Peterka et al. |
| 2007/0056040 A1 | 3/2007 | Van Den Heuvel et al. |
| 2007/0168293 A1 | 7/2007 | Medvinsky |
| 2007/0204064 A1 | 8/2007 | Mail et al. |
| 2007/0250617 A1 | 10/2007 | Kim et al. |
| 2008/0005034 A1 | 1/2008 | Kravitz et al. |
| 2008/0046271 A1 | 2/2008 | Jeong et al. |
| 2008/0046985 A1 | 2/2008 | Lenoir et al. |
| 2008/0047006 A1 | 2/2008 | Jeong et al. |
| 2008/0244706 A1 | 10/2008 | Lenoir et al. |
| 2008/0250508 A1 | 10/2008 | Montague et al. |
| 2008/0313085 A1 | 12/2008 | Kravitz et al. |
| 2009/0025061 A1 | 1/2009 | Kravitz |
| 2009/0044008 A1 | 2/2009 | Lim |
| 2009/0132811 A1 | 5/2009 | Koster et al. |
| 2009/0144815 A1 | 6/2009 | Vrielink et al. |
| 2009/0165101 A1 | 6/2009 | Peterka et al. |
| 2009/0165143 A1 | 6/2009 | Lee |
| 2009/0180621 A1 | 7/2009 | Kravitz et al. |
| 2010/0017888 A1 | 1/2010 | Zhang et al. |
| 2010/0257356 A1 | 10/2010 | Greevenbosch et al. |

OTHER PUBLICATIONS

Office Action for U.S. Appl. No. 12/477,104, dated Apr. 26, 2012, 21 pages.
Notice of Allowance for U.S. Appl. No. 12/477,104, dated Aug. 20, 2014, 18 pages.
Office Action for U.S. Appl. No. 12/477,104, dated Mar. 7, 2014, 12 pages.
Office Action for U.S. Appl. No. 12/477,104, dated Nov. 20, 2012, 12 pages.
Office Action for U.S. Appl. No. 12/574,365 dated Aug. 16, 2012, 18 pages.
Office Action for U.S. Appl. No. 12/574,365 dated Mar. 22, 2013, 20 pages.
Open Mobile Alliance, OMA DRM Specification, Jul. 23, 2008, Version 2.0.2.
Office Action for U.S. Appl. No. 12/574,365 dated Nov. 10, 2014, 17 pages.
Notice of Allowance for U.S. Appl. No. 12/574,365, dated Jan. 28, 2015, 22 pages.

* cited by examiner

SYSTEM AND METHOD FOR SECURING THE LIFE-CYCLE OF USER DOMAIN RIGHTS OBJECTS

RELATED APPLICATIONS

This application is a division of U.S. patent application Ser. No. 12/477,104, filed Jun. 2, 2009 and entitled, "SYSTEM AND METHOD FOR SECURING THE LIFE-CYCLE OF USER DOMAIN RIGHTS OBJECTS," which shares some common features with U.S. patent application Ser. No. 11/697,342, filed Apr. 6, 2007 and entitled "SYSTEM, DEVICE AND METHOD FOR INTEROPERABILITY BETWEEN DIFFERENT DIGITAL RIGHTS MANAGEMENT SYSTEMS," which issued on Oct. 11, 2011 as U.S. Pat. No. 8,037,541. The entireties of these applications are incorporated herein by reference.

BACKGROUND

Digital content has gained wide acceptance in the public. Such content includes, but is not limited to: movies, videos, music, and the like. Consequently, many consumers and businesses employ various digital media devices or systems that enable the reception of such digital multimedia content via several different communication channels (e.g., a wireless link, such as a satellite link, or a wired link, such as a cable connection). Similarly, the communication channel may also be a telephony based connection, such as DSL and the like. Regardless of the type of channel, the digital content and/or the distribution of the digital content is typically secured using a conditional access (CA) mechanism and a digital rights management (DRM) mechanism (e.g., encryption/decryption using keys).

Presently, specifications are being developed with respect to expanding the ways that content and services can be distributed over wireless communication networks. One such set of standards is being developed by the Open Mobile Alliance (OMA). In the OMA DRM system, for example, digital content (e.g., a movie or song) is associated with a rights object (RO). The RO provides granting rights to a client device for viewing or otherwise consuming the digital content. The entity in the client device that manages permissions and corresponding constraints relative to use of the digital content is commonly denoted as a DRM Agent. Nominally, a DRM Agent obtains an RO from a rights issuer (RI). DRM Agents conformant to the new OMA Secure Content Exchange (SCE) specifications (as well as to the legacy OMA DRM v2.x (i.e. OMA DRM v2.0 or OMA DRM v2.1) system) are intended to have the opportunity to participate in Rights transfers with other such DRM Agents, and to take full advantage of User Domains for which potentially multiple RIs and/or Local Rights Managers (LRM) create Rights Objects (designated as User Domain ROs). In the legacy OMA DRM v2.x system a domain is associated with and managed by a single Rights Issuer, which implies that each DRM Agent needs to register with each RI for which it wants to make successful use of Domain ROs generated by that RI. User Domains are intended to overcome that deficiency for SCE-conformant DRM Agents, while providing backwards-compatible domain support for legacy DRM Agents. This requires a secure association of Rights Issuers and/or Local Rights Managers with a Domain Enforcement Agent (DEA) that operates under oversight of a Domain Authority (DA), such that SCE-conformant DRM Agents can become members of (i.e., join) a User Domain that is managed by that DEA, be able to provide proof of membership in the User Domain, and be assured that a Rights Issuer or Local Rights Manager from which they accept User Domain Rights Objects is legitimately associated with that User Domain.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
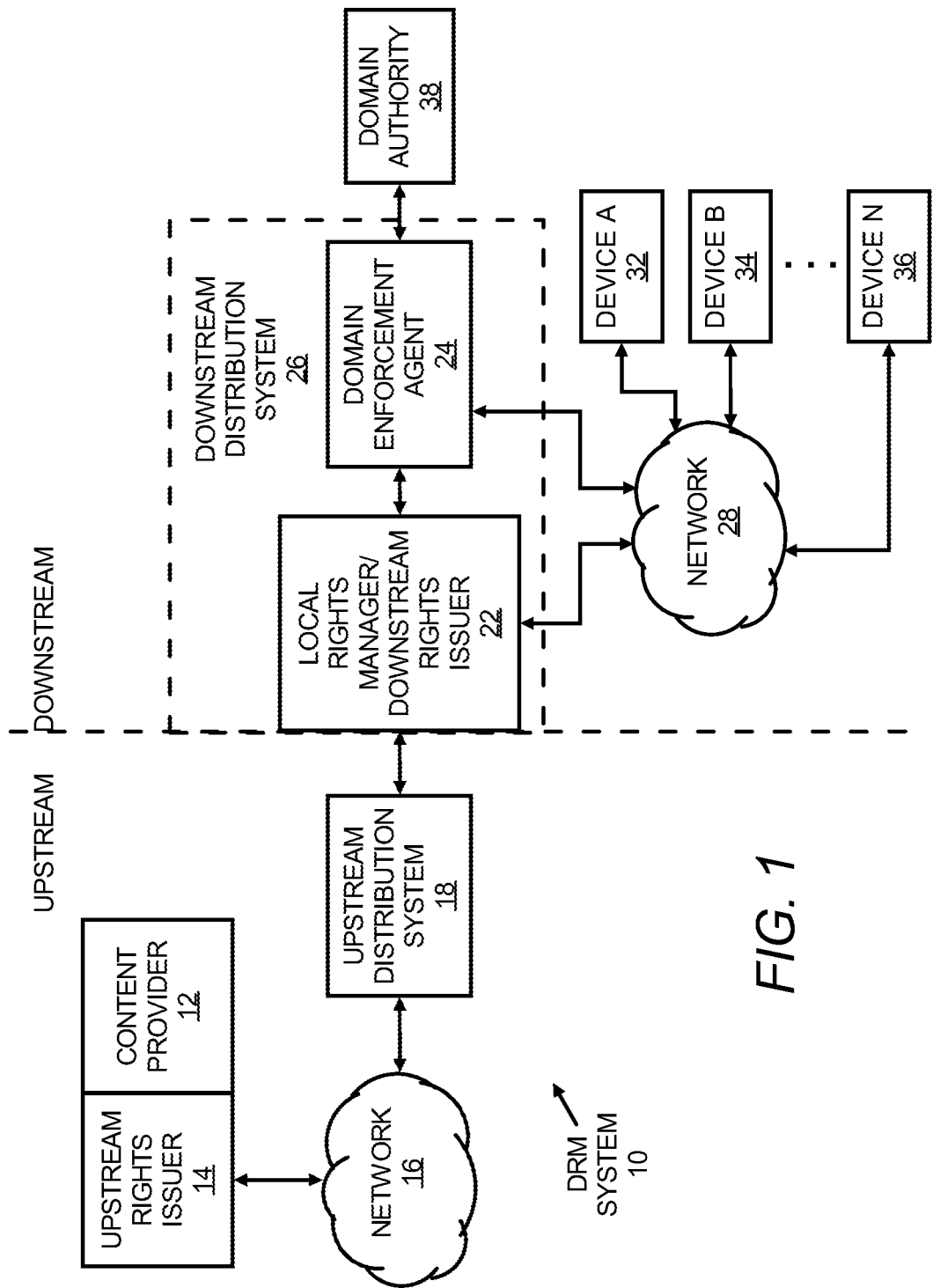
FIG. 1 illustrates a block diagram of a digital rights management (DRM) system operable in a secure content exchange (SCE) User Domain, according to an embodiment of the invention.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Definitions:

As used herein, the "domain authority" or "DA" entity is characterized by certificate with a domainAuthority key purpose. In addition, the DA type of entity is intended to be a service provider.

The "domain enforcement agent" or "DEA" entity is characterized by certificate with domainEnforcementAgentNetwork or domainEnforcementAgentLocal key purpose. The domainEnforcementAgentNetwork is typically a service provider. The domainEnforcementAgentLocal is typically a home-network entity, for instance, within a set-top box (STB) or a mobile device.

The "rights issuer" or "RI" entity is characterized by certificate with rightsIssuer key purpose, without localRightsManagerDevice key purpose, and without localRightsManagerDomain Key purpose. This entity type is typically a service provider.

The "local rights manager" or "LRM" is characterized by certificate with local RightsManagerDevice key purpose and/or localRightsManagerDomain Key purpose; such certificate may additionally include rightsIssuer key purpose. This entity type is typically a home-network entity (within an STB or mobile device that has access to upstream non-OMA DRM content and to rights that may be imported into OMA DRM (enabling DRM interoperability)). By way of example, the LRM (or associated software and/or hardware) is configured to convert signals to remove upstream non-OMA DRM protection on content, and in certain instances, to also transcode the content so that the resultant content matches the characteristics and/or limitations of the destination device. The LRM is configured to generate Rights Objects to enable cryptographic access to and controlled use of the OMA-DRM-protected content. By way of example, the LRM (or associated software and/or hardware) is configured to package the (possibly transcoded) content in OMA-DRM protected content form so that the resulting DRM Content Format (DCF), or Packetized DRM Content Format (PDCF) (for Continuous Media), can be made available to DRM Agents.

The "v2.x Device" entity is characterized by certificate with drmAgent key purpose, and without sceDrmAgent key purpose. The v2.x Device entity may comprise, for instance, a v2.0 or v2.1 device without SCE.

The "SCE Device" is characterized by certificate with drmAgent key purpose and sceDrmAgent key purpose. The SCE Device may include, for instance, a v2.1 DRM Agent. An SCE Device is distinguishable from a v2.x Device by an SCE-conformant RI and by another SCE Device (based on inclusion of sceDrmAgent key purpose). The SCE Device certificate must include drmAgent key purpose in order to be recognized by a v2.x RI. In OMA DRM v2.x, Devices do not communicate with each other using a cryptographic protocol and thus do not verify each other's certificate.

The "v2.x Domain" is a domain that is managed either by an RI, or by an LRM with rightsIssuer key purpose. The OMA DRM v2.1 DRM Specification makes no explicit mention of a Local Rights Manager (LRM) or of Secure Content Exchange (SCE), but Appendix I. (entitled "Import") makes reference to "import user equipment." In accordance with OMA DRM v2.1 such an import user equipment would have to be furnished with a certificate that is completely indistinguishable from a certificate provisioned to an RI. However, the newer SCE enabler allows for identifying a new entity (namely, an LRM) that is distinguishable from an RI by SCE-conformant RIs and by SCE-conformant DRM Agents/Devices (alternatively denoted as SCE Devices). A v2.x DRM Agent/Device cannot differentiate an LRM with rightsIssuer key purpose from an actual RI. Moreover, a v2.x Device may join a v2.x Domain and thus acquire (Domain-specific and Domain generation-specific) Domain key(s) via the RI, or via the LRM with rightsIssuer key purpose, while ignoring other key purposes, so that an LRM with rightsIssuer key purpose is essentially an RI from the perspective of the device. However, an SCE Device may not join a v2.x Domain managed by an LRM.

The "User Domain" is a domain that is managed by a DEA under the oversight of a DA in the form of a digitally-signed User Domain Authorization provided by the DA to the DEA for dissemination to relying RIs, LRMs, and SCE Devices. A v2.x Device may join a User Domain in the same manner that the v2.x Device may join a v2.x Domain and may not be aware that the v2.x Device is joining a User Domain. That is, the v2.x Device registers with an RI, or LRM with rightsIssuer key purpose, in order to establish an RI Context in the v2.x Device, and joins the User Domain (using the OMA DRM v2.x Join Domain Protocol), resulting in a Domain Context in the v2.x Device. Thus a v2.x Device may belong to an identical User Domain through multiple instances, each with a distinct RI or LRM with rightsIssuer key purpose. After registering with a DEA (resulting in a DEA Context), an SCE Device may join a specific User Domain managed by that DEA (resulting in a User Domain Context), and thus acquire (User Domain-specific and User Domain generation-specific) User Domain Key(s). This allows consolidation in that multiple RI(s) and/or LRM(s) may input to a single User Domain, thus enabling an SCE Device that has no context with the RI or LRM that initially created the User Domain Rights Object to consume based on its membership in the User Domain via the managing DEA. An SCE Device, furthermore, may maintain several User Domain Contexts relative to a single DEA, each corresponding to a single User Domain managed by that DEA. An SCE Device that does have an RI Context or LRM Context with an RI or LRM, respectively, may request a User Domain Rights Object directly from that entity without the need to join a domain using the OMA DRM v2.x Join Domain Protocol with that entity. The registration protocol used by an SCE Device with a DEA is designated in the SCE DOM Technical Specifications as the DRM Agent-DEA Registration Protocol, and the protocol used by an SCE Device to join a User Domain is designated in the SCE DOM Technical Specifications as the Join User Domain Protocol. As part of the DRM Agent-DEA Registration Protocol the SCE Device may receive a symmetric key (SK) and a message integrity key (MK) to establish a Security Association (SA) enabling to secure the confidentiality and integrity, respectively, of later communications between the SCE Device and the DEA, such as communications required for execution of the Join User Domain Protocol. In order to establish a User Domain Context, the SCE Device must have acquired a User Domain Authorization signed by a Domain Authority (DA) that identifies the particular DEA and the particular User Domain. If such User Domain Authorization indicates the need for SCE Device-specific DA-signed User Domain Authorizations, the SCE Device must also acquire such a User Domain Authorization that identifies itself and the DEA. Successful execution of the Join User Domain Protocol results, in particular, in acquisition by the SCE Device of a User Domain Authorization signed by the DEA that identifies the SCE Device and the particular User Domain. In addition, the SCE Device may receive one or more User Domain Authorizations signed by the DEA such that each identifies a particular RI or LRM (as well as the particular User Domain).

The "Device Rights Object" is initially targeted by an RI or LRM to a single specific Device. If the Device Rights Object is initially intended for a v2.x Device, the LRM's certificate must include a rightsIssuer key purpose. If the device rights object is initially intended for an SCE Device, the LRM's certificate must include a localRightsManagerDevice key purpose.

Although a v2.x Domain Rights Object is created by an RI or LRM with rightsIssuer key purpose by directly using the current generation of the appropriate Domain Key, this is not the case for the analogous generation of a User Domain Rights Object.

Referring first to FIG. 1, there is shown a block diagram of a digital rights management (DRM) system 10 operable in a secure content exchange (SCE) User Domain, according to an embodiment of the invention. It should be understood that the following description of the DRM system 10 is but one manner of a variety of different manners in which such a DRM system 10 may be configured and operated. In addition, it should be understood that the DRM system 10 may include additional components and that some of the components described may be removed and/or modified without departing from a scope of the DRM system 10.

As shown in FIG. 1, the DRM system 10 includes a content source or provider 12, an upstream digital rights issuer (RI) 14 associated with the content provider 12, a network 16 coupled to the content provider 12 and/or the upstream RI 14, and an upstream distribution system 18 coupled to the network 16. The content provider 12, the upstream RI 14, the network 16 and the upstream distribution system 18 are part of an upstream system or an upstream DRM system, which, in general, is the DRM system or portion of the DRM system in which the content originates or from which the content is distributed.

The system 10 also includes a Local Rights Manager (LRM) 22 and a Domain Enforcement Agent (DEA) 24, both of which may be part of a downstream distribution system, shown generally as 26, which is coupled to the upstream distribution system 18. As will be discussed in greater detail hereinbelow, the LRM 22 is generally configured to translate upstream licenses and protected content and issues licenses and other digital rights to one or more of the end user communication devices in the downstream system. Translation is the process that takes upstream licenses and protected content and makes that information available in the downstream DRM system. Thus, at least functionally, the LRM 22 also may be considered to be part of the upstream distribution system 18, or at least straddling the upstream and downstream systems. Also, as will be discussed in greater detail hereinbelow, the DEA 24 defines and manages the "User Domain," which is the set of end user communication devices that are allowed to share Domain Licenses. End user communication devices in the same domain share a Domain key, as also discussed in greater detail herein below.

The DRM system 10 also includes a network 28 that couples the downstream distribution system 26 to one or more end user communication devices 32, 34 and 36. The downstream distribution system 26, the network 28 and the end user communication devices 32, 34, 36 are part of a downstream system or downstream DRM system. In general, the downstream DRM system is the DRM system or portion of the DRM system to which the protected content is transmitted or distributed. As discussed, translation is the process that takes upstream licenses and protected content and makes that information available in the downstream DRM system.

Also shown in FIG. 1 is a downstream RI 22, which may be provided in the downstream distribution system 26, for instance, when the downstream distribution system 26 does not have an LRM, or may be provided in addition to and independently of an LRM 22. In addition, the downstream RI 22 may be associated with a downstream content provider (not shown) that differs from the upstream content provider 12.

The LRM/downstream RI 22 is provisioned with an identity certificate, which includes a public key corresponding to a private key that is provisioned to the LRM/downstream RI 22, and an attribute certificate/authorization certificate, which identifies the LRM/downstream RI 22 as well as the particular User Domain. The attribute certificate, which is often designated as a User Domain Authorization, is signed by the DEA 24, which manages the User Domain. In addition, the User Domain Authorization does not include a public key of the identified LRM/downstream RI 22. A device 32-36, may determine that the LRM/downstream RI 22 is authorized to issue domain ROs for a particular User Domain managed by a particular DEA 24 based upon the User Domain Authorization of the LRM/downstream RI 22 that is signed by the DEA 24. In addition, the DEA 24 may determine whether or not the LRM/downstream RI 22 is authorized to register with the DEA 24 and/or may determine whether or not the LRM/downstream RI 22 is authorized to be associated with a particular User Domain.

One means by which the DEA 24 may make a determination as to whether or not the LRM/downstream RI 22 is authorized to be associated with a particular User Domain is by attempting to procure a User Domain Authorization that is signed by the DA 38 and that identifies the DEA 24 and the particular LRM/downstream RI 22. The User Domain Authorization that is signed by the DA 38 and that identifies the DEA 24 and a particular User Domain may include an element that indicates to the DEA 24 and LRM/downstream RI 22 that a separate User Domain Authorization that is signed by the DA 38 and that identifies the DEA 24 and the particular LRM/downstream RI 22 is required in order for the LRM/downstream RI 22 to be authorized to be associated with the User Domain by that DEA 24. If such an element is present, it is necessary for the DEA 24 to procure a distinct such User Domain Authorization that identifies the LRM/downstream RI 22 for each LRM/downstream RI 22 the DEA 24 associates with the User Domain. It is not necessary for the DEA 24 to procure a distinct such User Domain Authorization that identifies the LRM/downstream RI 22 for each User Domain.

The LRM 22 and/or a downstream RI 22 registers with the DEA 24. This protocol is designated in the SCE DOM Technical Specifications as the RI-DEA Registration Protocol. A successful execution of the RI-DEA Registration Protocol results in a DEA Context in the downstream RI or LRM 22. As part of the RI-DEA Registration Protocol, the downstream RI or LRM 22 may receive a symmetric key (SK) and a message integrity key (MK) to establish a Security Association (SA) enabling to secure the confidentiality and integrity, respectively, of later communications between the downstream RI or LRM 22 and the DEA 24, such as communications required for execution of the Get User Domain Authorization Protocol discussed herein below. As part of the protocol that associates the downstream RI or LRM 22 with a particular User Domain, the downstream RI or LRM 22 receives a User Domain Authorization (signed by the DEA 24) that represents its association with the DEA 24 and with the particular User Domain; the downstream RI or LRM 22 may also receive a User Domain Authorization (signed by the DA 38) that represents its association with the DEA 24. This protocol is designated in the SCE DOM Technical Specifications as the Get User Domain Authorization Protocol.

Successful execution of the Get User Domain Authorization Protocol results in establishment of a new or updated User Domain Context in the downstream RI or LRM 22 for that specific User Domain. Successful execution of the Get User Domain Authorization Protocol requires, in particular, that the downstream RI or LRM 22 receive (or already have) a currently valid User Domain Authorization signed by the DA 38 that identifies the particular DEA 24 and particular User Domain. It is possible for a DEA 24 (such as that provisioned with a certificate with domainEnforcementAgentLocal key purpose) to be pre-provisioned with a User Domain Authorization signed by a DA 38 that identifies the DEA 24 and a User Domain and that does not indicate the need for further (downstream RI- or LRM 22-specific or DRM Agent-specific) DA-signed User Domain Authorizations, so as to enable "out-of-the-box" use of the DEA 24 without the need to communicate with a DA 38.

According to an embodiment, the LRM and/or the downstream RI 22 receives keying material (during execution of the Get User Domain Authorization Protocol) that enables the LRM and/or the downstream RI 22 to generate User Domain ROs, but that does not enable derivation of the User Domain Keys themselves that the Devices 32-36 may use to cryptographically access the User Domain ROs. In this embodiment, the registration of the LRM 22 and/or the downstream RI with the DEA 24 (using the RI-DEA Registration Protocol that precedes initial execution of the Get User Domain Authorization Protocol) may differ from a standard registration of a Device 32 with a downstream RI 22. More particularly, the RI-DEA Registration Protocol may differ in that the downstream RI and/or the LRM 22 receives Security Association (SA) keys that are used during the Get User Domain Authorization Protocol. These SA keys may be protected during transmission by using encryption based on the certified public key of the downstream RI or LRM 22. For security, these SA keys are typically assigned different values than those transmitted from the DEA 24 to a Device 32 during execution of the DRM Agent-DEA Registration Protocol.

The content source or provider 12 may be any suitable transmission source of DRM-protected content, including multimedia content. For example, the content provider 12 may be an over-the-air broadcaster, from a cable television plant, satellite service provider or other content service provider, such as a telephone system. The content provider 12 may be connected to the network 16 and/or the upstream distribution system 18 via any suitable connection, e.g., one or more coaxial cables and/or optical fibers or optical fiber cables, including a Hybrid Fiber Coaxial (HFC) cable system. Other suitable connections include suitable Fiber To The Premises (FTTP) systems, such as Fiber To The Curb (FTTC) or Fiber To The Home (FTTH), or over any suitable number of digital subscriber line systems (xDSL). Also, the content provider 12 may provide DRM-protected content wirelessly, e.g., via over-the-air-broadcast from a satellite service provider or other suitable content service provider.

The content provided by the content provider 12 can be any multimedia content, including DRM-protected content, that is suitable for transmission to one or more end user communication devices. For example, multimedia content may include broadcast video, including movies, programming events, music and/or other multimedia content that is distributed, e.g., as one or more programming streams from the content provider 12 or other suitable content source. The multimedia content typically is a plurality of digital signals formatted according to a suitable standard, such as the MPEG (Moving Picture Experts Group) 2 or MPEG 4 standard, and multiplexed into a data stream that is modulated on a carrier using quadrature amplitude modulation (QAM) or other suitable modulation technique.

The upstream digital rights issuer 14 may be any suitable entity associated with or system component, element and/or portion of the content provider 12 that is suitable for generating and/or providing content protection information associated with content provided by the content provider 12. In general, content protection information includes licenses and any other digital rights issuance information that enables the use of associated content under specified conditions. For example, content protection information may include privileges, permissions and/or constraints regarding access to its associated content by one or more end user communication devices in the upstream distribution system 18. A downstream RI 22 is associated with a content provider (not shown) that may be distinct from content provider 12. A downstream RI 22 is suitable for generating and/or providing content protection information associated with content provided by a content provider with which the downstream RI is associated. Specific content protection information will be discussed hereinbelow.

One or more of the network 16, the upstream distribution system 18, the downstream distribution system 26 and the network 28 may be any communication network or network server arrangement suitable for transmitting DRM-protected content and associated rights issuance information between the content provider 12 (and upstream RI 14) and one or more of the end user communication devices in the upstream distribution system 18. For example, one or more of the network 16, the upstream distribution system 18, the downstream distribution system 26 and the network 28 may be or include a cable television network, the Internet or an Internet protocol (IP) based or other packet-based network, or other suitable public network, including a telephone network. Also, one or more of the network 16, the upstream distribution system 18, the downstream distribution system 26 and the network 28 may be or include a computer network, a web-based network or other suitable wired or wireless network or network system. Thus, one or more connections between any one or more of the network 16, the upstream distribution system 18, the downstream distribution system 26 and the network 28 can be or include one or more coaxial cables and/or optical fibers, including a Hybrid Fiber Coaxial (HFC) cable system, one or more Fiber To The Premises (FTTP) systems, such as Fiber To The Curb (FTTC) or Fiber To The Home (FTTH), over any suitable number of digital subscriber line systems (xDSL), and/or wirelessly.

One or more of the end user communication devices in the upstream distribution system 18 and one or more of the (downstream) end user communication devices 32, 34, 36 may be any suitable end user communication device configured to receive, process, store, display and/or otherwise execute or consume DRM-protected content and/or associated rights issuance information. For example, one or more of the end user communication devices can be any signal converter or decoder (set-top) box, including set-top boxes with internal and/or external recording capabilities and local and/or remote storage, which often are referred to as personal video recorder (PVR) devices, digital video recorder (DVR) devices and/or digital video server (DVS) devices. Other suitable end user communication devices include residential gateways, home media server systems, digital video disk recorders, computers, televisions with built-in or added-on content receiving and storing capability, and/or other suitable computing devices or content devices, including internet protocol (IP), satellite and cable digital video recorders, and home area network (HAN) devices and systems. Also, one or more of the end user communication devices can be mobile communication devices, such as cellular telephones, smart telephones (smartphones), personal digital assistants (PDAs), digital music players (e.g., MP3 players), portable video players and/or other handheld mobile devices, media players in automobiles, laptop personal computers (PCs), notebook PCs and/or other mobile computing devices. The LRM 22 may be part of a set-top box (not shown) in the upstream distribution system 18.

Each of the end user communication devices 32, 34, 36 typically includes a DRM Agent (not shown), which is configured to obtain, e.g., from the LRM and/or a downstream RI 22, downstream content licenses and/or other rights issuance information for items of content. The DRM Agent also manages the authentication/verification of the downstream content license for a content item, the conditional access of the content item (e.g., decryption), and the enforcement of the DRM permissions specified in the downstream content license.

The DRM Agents of the communication devices 32-36 may be one of a v2.x (legacy) DRM Agent or an SCE-conformant DRM Agent. A device having a v2.x DRM Agent may generally be considered as conforming to v2.0 or v2.1 of the OMA DRM Specifications. A device having an SCE-conformant DRM Agent may generally be considered as conforming with the OMA Secure Content Exchange Specifications. A device having an SCE-conformant DRM Agent may generally be considered as additionally conforming to v2.1 of the OMA DRM Specifications. In this regard, in a v2.x Domain, the v2.x DRM Agent is managed by a downstream RI or by an LRM 22 with rightsIssuer key purpose. The provisioning of a certificate with rightsIssuer key purpose may be restricted to an LRM 22 that has the capability to generate all the appropriate keys for issuing ROs, such as Domain Keys for v2.x Domain ROs. In addition, a v2.x DRM Agent may join a v2.x Domain, and thus acquire Domain Key(s) for the v2.x Domain from a downstream RI or the LRM 22 with rightsIssuer key purpose. However, an SCE-conformant DRM Agent is not able to join a v2.x Domain managed by an LRM 22.

In an SCE-Compliant Domain, e.g., a User Domain, a v2.x DRM Agent is able to join the User Domain as previously discussed with respect to the v2.x Domain. An SCE-conformant DRM Agent may join the User Domain, and thus acquire User Domain Key(s) via the DEA 24 that manages that User Domain. In one regard, this allows consolidation in that multiple downstream RI(s) and/or LRM(s) may input to a User Domain, thus enabling an SCE-conformant DRM Agent that has no context with the downstream RI or LRM 22 that initially created the User Domain RO to consume based on its membership in the User Domain via the managing DEA 24.

A Device RO, as differentiated from a User Domain RO or v2.x Domain RO, is initially targeted by a downstream RI or LRM 22 to a single specific v2.x or SCE-conformant DRM Agent. If the Device RO was initially intended for a v2.x DRM Agent, the LRM's 22 certificate must include a rightsIssuer key purpose. If the Device RO was initially intended for an SCE-conformant DRM Agent, the LRM's 22 certificate must include a local RightsManagerDevice key purpose.

A Domain RO or User Domain RO that is not further targeted (as discussed hereinbelow) differs from the Device RO in that the Domain RO or User Domain RO is not initially intended for a particular device, but instead, is intended for a particular v2.x Domain or User Domain. A DRM Agent is only able to access the Domain RO by going to the downstream RI to join the v2.x Domain. However, in a User Domain, an SCE-conformant DRM Agent need not go to the downstream RI that created the particular User Domain RO, but instead, goes to the DEA 24.

Figure 2:
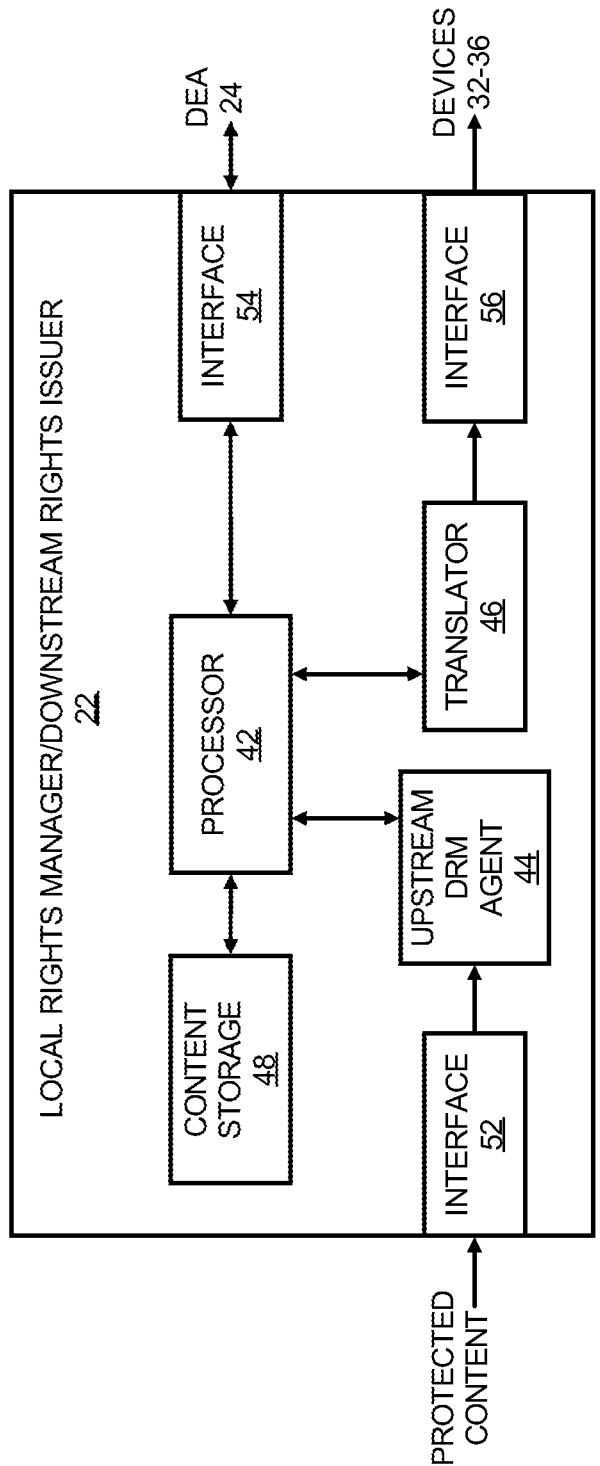
FIG. 2 depicts a block diagram of a Local Rights Manager (LRM), according to an embodiment of the invention.

Referring now to FIG. 2, with continuing reference to FIG. 1, shown is a block diagram of the LRM 22/RI 22 used in the DRM system 10. The LRM/RI 22 may be partially or completely any suitable device or subsystem (or portion thereof) within the downstream distribution system 26 and/or the network 28 coupled thereto. In general, the LRM 22 is responsible for receiving licenses and other digital rights issuance information from the upstream RI 14 and/or other components in the upstream portion of the DRM system 10 and controlling the issuance of those licenses and digital rights to one or more end user communication devices 32-36.

The LRM 22 includes a processor or controller 42, an upstream DRM agent 44 coupled to the processor 42, a translator 46 coupled to the processor 42, and a content storage element 48 coupled to the processor 42. In general, the processor 42 processes content and associated DRM information received by the LRM 22. In addition to the content storage element 48, the processor 42 may include at least one type of memory or memory unit (not shown) and a storage unit or data storage unit coupled to the processor for storing processing instructions and/or information received by the LRM 22.

The upstream DRM agent 44 is configured to receive content licenses and other digital rights issuance information from the upstream distribution system 18 for associated content. As discussed generally hereinabove, the upstream DRM agent 44 manages the authentication or verification of the content license for a content item, the conditional access of the content item (e.g., decryption), and the enforcement of the DRM permissions and/or constraints specified in the content license. Such information can be characterized as DRM data or DRM information.

The translator 46 converts or generates a converted version of the licenses and/or other digital rights issuance information from a first DRM format or scheme to at least one second DRM format or scheme. For example, the translator 46 translates DRM information issued according to the DRM format used by the upstream RI 14 to the DRM format supported by the particular end user communication device to which the DRM information is being transferred, at least to the extent that such DRM formats or schemes are different and/or incompatible.

The LRM 22 also may include one or more input and/or output interfaces for receiving and/or transmitting content and associated DRM information. For example, the processor 42 and other components in the LRM 22 may be coupled between a first or input interface 52, which receives content and associated DRM information from the upstream distribution system 18, and one or more second or output interfaces 56, which transfer processed content and associated DRM information, including stored content and associated DRM information, to one or more end user communication devices. One or more input and output interfaces 54 is coupled to the processor 42. It should be understood that one or more of the interfaces 52, 54, 56 may be a single input/output interface coupled to the processor 42. Also, it should be understood that one or more of the interfaces 52, 54, 56 may be an interface configured to support more than one upstream RI 14 and/or end user communication device.

One or more of the processor 42, the upstream DRM agent 44, the translator 46, the content storage element 48 and the interfaces 52, 54, 56 may be comprised partially or completely of any suitable structure or arrangement, e.g., one or more integrated circuits. Also, it should be understood that the LRM 22 includes other components, hardware and software (not shown) that are used for the operation of other features and functions of the LRM 22 not specifically described herein.

The LRM 22 may be partially or completely configured in the form of hardware circuitry and/or other hardware components within a larger device or group of components. Alternatively, the LRM 22 may be partially or completely configured in the form of software, e.g., as processing instructions and/or one or more sets of logic or computer code. In such configuration, the logic or processing instructions typically are stored in a data storage device, e.g., the content storage element 48 or other suitable data storage device (not shown). The data storage device typically is coupled to a processor or controller, e.g., the processor 42. The processor 42 accesses the necessary instructions from the data storage device and executes the instructions or transfers the instructions to the appropriate location within the LRM 22.

With respect to the content storage element 48, the LRM 22 may have access to a hard drive or other storage element for recording streams of multimedia content, such as video streams broadcast from the multimedia content source. However, the content storage element 48 may be any suitable information storage unit, such as any suitable magnetic storage or optical storage device, including magnetic disk drives, magnetic disks, optical drives, optical disks, and memory devices, including random access memory (RAM) devices and flash memory. Also, although the content storage element 48 is shown within the LRM 22, the content storage element 48 can be located external to the LRM 22 and suitably coupled thereto.

If a downstream RI 22 or LRM 22, where the LRM 22 has a certificate with rightsIssuer key purpose, created a v2.x Domain Rights Object (RO) at the request of a particular v2.x DRM Agent, the v2.x DRM Agent may still go to that downstream RI or LRM 22 to make use of that RO by joining the v2.x Domain if not already a member or if the Domain has been upgraded, in order to receive the Domain Key (or perhaps multiple Domain Keys if past Domain Keys cannot be algorithmically derived by the v2.x DRM Agent from the current generation Domain Key). The same is true for an SCE-conformant DRM Agent in the case of a downstream RI 22, but not in the case of an LRM 22, whether or not such LRM 22 has a certificate with rightsIssuer key purpose.

However, in a User Domain, the User Domain ROs are going to be attributable to a particular LRM/downstream RI 22 that produced the User Domain ROs; whereas, the User Domain is managed by the DEA 24 rather than the LRM/downstream RI 22. So an SCE Device that seeks to make use of a User Domain RO is typically required to go to the DEA 24 to register and join the User Domain. The downstream RI 22 and/or the LRM 22 are also typically required to go to the DEA 24 to become associated with the User Domain. However, according to an embodiment of the invention, the LRM/downstream RI 22 does not receive the User Domain Key from the DEA 24 but is able to generate the User Domain ROs as discussed in greater detail herein below.

Although an SCE-conformant DRM Agent is able to join the User Domain because it is already registered with the DEA 24, and thus receives a User Domain Key in order to make use of the User Domain RO, a v2.x DRM Agent may not possess an appropriate certificate of its own (such as one that includes an sceDrmAgent key purpose) and/or may not be equipped to recognize the certificate of the DEA 24 (such as the presence of a domain EnforcementAgentNetwork or domainEnforcementAgentLocal key purpose), so as to register with the DEA 24 or to join the User Domain via the DEA 24, and thus may be unable to make use of the User Domain RO by this means. Thus, a v2.x DRM Agent may join a User Domain by the same process as joining a v2.x Domain in so far as the process is visible to the v2.x DRM Agent. The v2.x DRM Agent remains oblivious to any interaction between the LRM 22 with (at least) rightsIssuer key purpose and localRightsManagerDomain key purpose or the downstream RI 22 and the DEA 24.

In addition, a User Domain Key may not be delivered the first time to a particular v2.x DRM Agent without the express permission and involvement of the DEA 24 because rather than receiving a v2.x Domain Key derived from the User Domain Key from the DEA 24, each upstream RI 14 and LRM/downstream RI 22 associated with the User Domain receives alternative keying material from the User Domain Key, in which this alternative keying material cryptographically enables the generation of User Domain Rights Objects, but does not enable unilateral joining of a v2.x DRM Agent to the User Domain by a downstream RI 22 or LRM 22 with rightsIssuer key purpose without the involvement of the DEA 24 at least the first time that v2.x DRM Agent attempts to join the current generation of the User Domain. The alternative keying material is in the form of a Rights Object Encryption Key (REK) and message authentication (MAC) keys, where one such MAC key may be used by the downstream RI 22 or LRM 22 to trigger a v2.x DRM Agent to leave the instance of the User Domain relative to that particular LRM/downstream RI 22. In addition, the DEA 24 may encrypt the REK and the MAC keys under the appropriate User Domain Key prior to communicating the REK and MAC keys to the LRM/downstream RI 22, since the LRM/downstream RI 22 is incapable of doing that due to lack of knowledge of the User Domain Key.

Moreover, all or part of the following may be transmitted as part of the execution of the Get User Domain Authorization Protocol, possibly in a form encrypted for confidentiality using SK and integrity-protected using MK based on a Security Association (SA) that may have been set up as a result of having executed the RI-DEA Registration Protocol: $K_{MAC}$ (i.e., a MAC key used by the LRM/downstream RI 22 when generating a User Domain RO), $K_{REK}$ (i.e., a REK used by the LRM/downstream RI 22 when generating a User Domain RO), AES-WRAP (UDK, $K_{MAC}|K_{REK}$) (i.e., the AES-WRAP encryption, using the User Domain Key (UDK), of the concatenation of KMAC and KREK, that is used by the LRM/downstream RI 22 when generating a User Domain RO, $K_{MAC\text{-}Leave}$ (i.e., a MAC key used by the LRM/downstream RI 22 when a v2.x DRM Agent is triggered to leave the User Domain), and AES-WRAP(UDK, $K_{MAC\text{-}Leave}$) (i.e., the AES-WRAP, using the UDK, of KMAC-Leave that is used by the LRM/downstream RI 22 when a Device is triggered to leave the User Domain.

Figure 3:
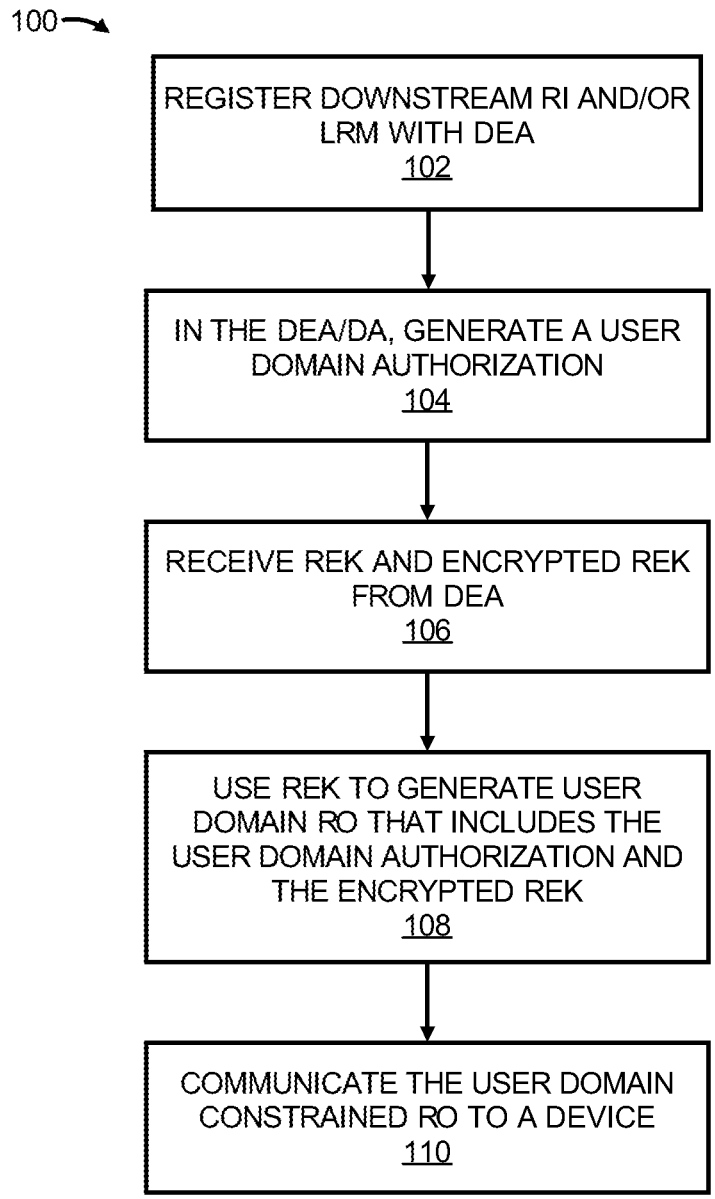
FIG. 3 depicts a flow diagram of a method for enabling support for backwards compatibility for legacy DRM Agents, according to an embodiment of the invention.

Some of the operations performed by and interactions between the LRM/downstream RI 22, and the DEA 24 are described in greater detail with respect to the method 100 depicted in FIG. 3. FIG. 3, more particularly, depicts a flow diagram of a method 100 of enabling support for backwards compatibility for legacy DRM Agents in a User Domain, according to an embodiment of the invention. It should be understood that the method 100 depicted in FIG. 3 may include additional steps and that some of the steps described herein may be removed and/or modified without departing from a scope of the method 100.

At step 102, the LRM/downstream RI 22 is registered with the DEA 24 as a prerequisite to becoming associated with the User Domain or one of the User Domains that is managed by the DEA 24. As part of the get User Domain Authorization process, at step 104, the DEA 24 generates a User Domain Authorization for the LRM/downstream RI 22 that identifies the LRM/downstream RI 22 and the particular User Domain, and that is signed by the DEA 24. Additionally, as part of the get User Domain Authorization process, the DEA 24 generates a key set comprised of $K_{MAC}$, $K_{REK}$, AES-WRAP(UDK, $K_{MAC}|K_{REK}$) (i.e., the AES-WRAP encryption, using the User Domain Key (UDK), $K_{MAC\text{-}Leave}$, and AES-WRAP(UDK, $K_{MAC\text{-}Leave}$). As described hereinabove, one or more of the elements of this key set may be encrypted using the Security Association (SA) that was established as part of the registration of the LRM/downstream RI 22 with the DEA 24 at step 102. The entire message may be integrity protected using this SA.

The message may also include one or more DA-signed User Domain Authorizations, such as identifying the DEA 24 and the User Domain, and/or identifying the DEA 24 and the particular LRM/downstream RI 22, as described hereinabove. As described herein above, $K_{MAC\text{-}Leave}$, and AES-WRAP(UDK, $K_{MAC\text{-}Leave}$) are intended to be used by an RI 22 or an LRM 22 with certificate that includes rightsIssuer key purpose (as well as localRightsManagerDomain key purpose), and thus need not be transmitted by the DEA 24 to an LRM 22 that has localRightsManagerDomain key purpose (and possibly localRightsManagerDevice key purpose) but not rightsIssuer key purpose.

At step 106, the LRM/downstream RI 22 receives the message generated at step 104. In particular the LRM/downstream RI 22 receives the (possibly SA-based encrypted and integrity-protected) Rights Object Encryption Key (REK) and encrypted REK from an entity that generated a User Domain Authorization for the LRM/downstream RI 22. By virtue of the encryption aspect of the first wrapping and the second wrapping under the User Domain Key, the LRM/downstream RI 22 receives matched plain and ciphertext rather than the key is that allows a conversion from the plain text to ciphertext. In addition, instead of communicating the key, which in this case is the UDK, so that the LRM/downstream RI 22 may go from plain text to ciphertext, the DEA 24, at step 106, is communicating matched plain text and ciphertext to the LRM/downstream RI 22. The LRM/downstream RI 22 is able to use the matched plan text and the ciphertext to create the User Domain ROs.

At step 108, the LRM/downstream RI 22 uses the REK to generate a User Domain Rights Object (RO) that includes the User Domain Authorization and the encrypted REK. More particularly, the User Domain RO is cryptographically accessible to any v2.x (legacy) DRM Agent that has previously been registered with the particular LRM 22 with, in particular, rightsIssuer key purpose or with the particular downstream RI 22, and has an RI/LRM-specific and domain-specific-domain context. The legacy DRM Agent may be registered with the particular LRM/downstream RI 22 in manners similar to those as prerequisite for joining legacy Domains. The communications between the legacy DRM Agent and the LRM/downstream RI 22 to enable joining a User Domain may be done in manners similar to those used for joining legacy Domains. The User Domain RO is also cryptographically accessible to any SCE-conformant DRM Agent that possesses knowledge of the User Domain Key for the appropriate generation of the User Domain.

According to an embodiment, at step 108, the LRM/downstream RI 22 generates the User Domain ROs (or User Domain Constrained ROs described hereinbelow) without making use of a User Domain Key, either on the downstream side or the upstream side. Instead, the LRM/downstream RI 22 overlays the so-called RO acquisition protocol with the User Domain Authorization, regardless of whether the Device has a v2.x DRM Agent or an SCE-conformant DRM Agent. More particularly, a backwards-compatible User Domain RO may be generated for use by v2.x DRM Agents or SCE-conformant DRM Agents, by using the REK provided by the DEA 24 and including the encrypted REK in the RO, whereas a User Domain Constrained RO initially targeted to a particular SCE-conformant DRM Agent may be generated by using an REK chosen by the LRM/downstream RI 22. As will be discussed herein below, in the case of a User Domain Constrained RO the User Domain Authorization overlay includes acquisition by the LRM/downstream RI of a DEA-signed User Domain Authorization that identifies the particular SCE-conformant DRM Agent and the User Domain as a condition of the LRM/downstream RI generating the User Domain Constrained RO targeted to that SCE-conformant DRM Agent. In both the case of the backwards-compatible User Domain RO and User Domain Constrained RO, a DEA-signed User Domain Authorization that identifies the particular LRM/downstream RI and the User Domain may be included as part of the RO, although a v2.x DRM Agent may ignore the embedded User Domain Authorization.

At step 110, the LRM/downstream RI 22 communicates the User Domain Constrained RO with the User Domain Authorization overlay to a Device 32-36 with an SCE-conformant DRM Agent, or the LRM/downstream RI 22 distributes the backwards-compatible User Domain RO using the so-called RO acquisition protocol, or in a potentially out-of-band manner since it is intended to be usable by any v2.x DRM Agent or SCE-conformant DRM Agent that has become a member of the User Domain via that particular LRM/downstream RI 22 or via the DEA 24, respectively. The SCE-conformant DRM Agents are able to make use of the User Domain Constrained ROs through application of techniques that are similar to the legacy manner of handling Device ROs. The v2.x DRM Agents are able to make use of the backwards-compatible User Domain ROs through application of techniques that are similar to the legacy manner of handling Domain ROs. In either case, the LRM/downstream RI 22 provides the User Domain ROs (or User Domain Constrained ROs) without making use of a User Domain Key.

When a v2.x DRM Agent receives the backwards-compatible User Domain RO overlaid with the User Domain Authorization, the v2.x DRM Agent ignores the User Domain Authorization, and may join the User Domain in the standard manner of joining a v2.x Domain when processing a Domain RO that corresponds to a Domain of which the v2.x DRM Agent is not yet a member, such as by contacting an RI based on the RI URL in the relevant DCF. When an SCE-conformant DRM Agent receives the backwards-compatible User Domain RO overlaid with the User Domain Authorization, the SCE-conformant DRM Agent may join the User Domain, if not already a member, by determining from the User Domain Authorization the User Domain ID and the identity and contact URL of the DEA responsible for the particular User Domain.

Joining the User Domain enables a v2.x DRM Agent or SCE-conformant DRM Agent to make use of backwards-compatible User Domain ROs. As such, the LRM/downstream RI 22 does not need to have access to the User Domain Key from the DEA 24 in order to generate User Domain ROs that are compatible to both v2.x and SCE-conformant DRM Agents. As a condition of generating a User Domain Constrained RO, the LRM/downstream RI 22 may verify that the intended recipient SCE-conformant DRM Agent is already a current member of the User Domain, based on a DEA-signed User Domain Authorization that identifies the particular SCE-conformant DRM Agent and the User Domain.

In one regard, by not granting access to the User Domain Key or any derived Domain Key to the LRM/downstream RI 22, the User Domain Key is not corrupted due to an LRM/downstream RI 22 going bad or otherwise becoming rogue. In another regard, the LRM/downstream RI 22 may continue to reuse the REK and MAC key ($K_{MAC}$) for each User Domain RO until the User Domain is upgraded. As such, the bandwidth requirements between the upstream RI 14 and/or the LRM/downstream RI 22 and the DEA 24/DA 38 may be relatively low.

According to an embodiment, the DA 38 may be enabled to turn on or off the permission for a DEA 24 to participate in joining a v2.x DRM Agent to a particular User Domain by including such indication in the DA-signed User Domain Authorization that identifies the DEA and the User Domain. In another embodiment, an LRM/downstream RI 22 may be alerted to as to whether or not the LRM/downstream RI 22 is allowed to participate in joining a v2.x DRM Agent to a particular User Domain by including such indication in the DEA-signed User Domain Authorization that identifies the particular LRM/downstream RI 22 and the User Domain.

Figure 4:
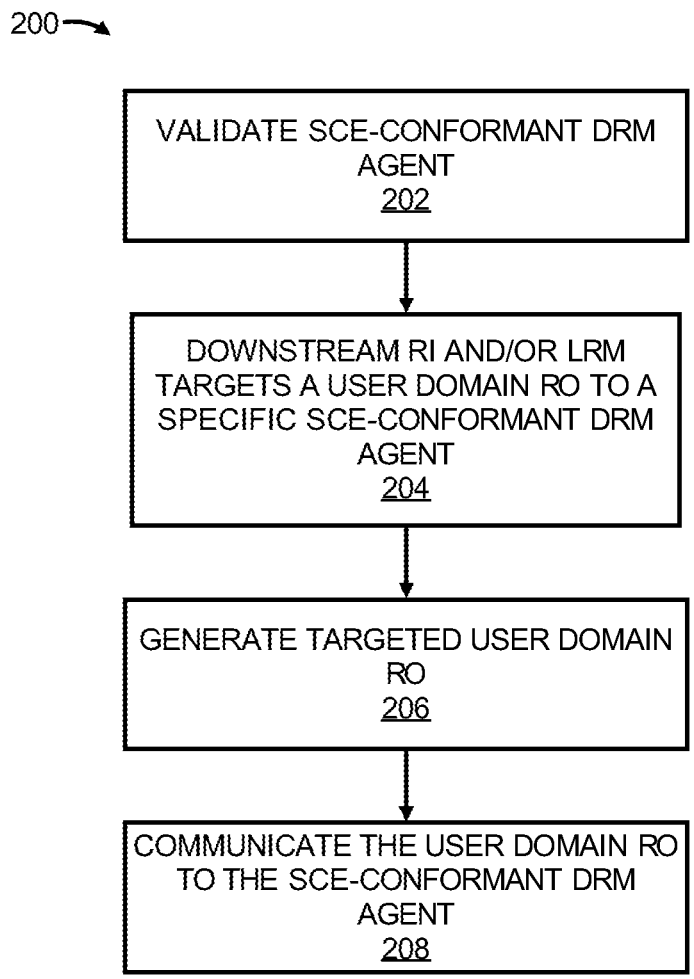
FIG. 4 depicts a flow diagram of a method for targeting a User Domain RO to a specific SCE-conformant DRM Agent, according to an embodiment of the invention.

With reference now to FIG. 4, there is shown a flow diagram of a method 200 for targeting a User Domain RO to a specific SCE-conformant DRM Agent, according to an embodiment of the invention. It should be understood that the method 200 depicted in FIG. 4 may include additional steps and that some of the steps described herein may be removed and/or modified without departing from a scope of the method 200.

Generally speaking, the downstream RI 22 and/or the LRM 22 with a certificate with, in particular, localRightsManagerDomain key purpose, is configured to target a User Domain RO to a particular SCE-conformant DRM Agent without making use of a User Domain Key (where such a targeted User Domain RO is referred to as a <userDomain>-constrained RO within the OMA SCE Technical Specifications to differentiate it from a backwards-compatible User Domain RO). As such, and as discussed above, the LRM/downstream RI 22 may not be provided with a User Domain Key for the User Domain, which affords certain security benefits. Instead, the LRM/downstream RI 22 is configured to use a User Domain Authorization from the SCE-conformant DRM Agent as assurance that it is acceptable to generate the User Domain RO for use by that particular DRM Agent because the DRM Agent has indirectly proven its knowledge of the User Domain Key. Unlike the case of a backwards-compatible User Domain RO, the DRM Agent does not explicitly use knowledge of the User Domain Key in order to enable recovery of the REK. Prior to using the targeted User Domain RO to access the associated content, the SCE-conformant DRM Agent may determine that the LRM/downstream RI 22 is authorized to deliver the User Domain RO, by verifying the User Domain Authorization of the LRM/downstream RI 22, where such User Domain Authorization may be part of the User Domain RO and/or delivered separately from the User Domain RO.

Alternatively to receiving a User Domain Authorization for the SCE-conformant DRM Agent from the SCE-conformant DRM Agent, the LRM/downstream RI 22 may receive the User Domain Authorization of the SCE-conformant DRM Agent from the DEA 24. This User Domain Authorization could be received by other alternative means since its confidentiality need not be protected in transit and its source and validity is verifiable because the User Domain Authorization has been signed by the DEA 24 and identifies the particular SCE-conformant DRM Agent and the User Domain. The identification of the User Domain may include, in particular, an indication of the specific generation of the User Domain. Similarly, the User Domain Authorization of the LRM/downstream RI 22 is signed by the DEA 24 and identifies the particular LRM/downstream RI 22 and the User Domain. The LRM/Downstream RI 22 may have previously stored a still valid User Domain Authorization for the Device and thus not require receipt of a new one. At the point of requesting a User Domain RO, the SCE-conformant DRM Agent need not be aware of whether such request will result in a backwards-compatible User Domain RO or a targeted User Domain RO. If the LRM/downstream RI 22 intends to issue a targeted User Domain RO but does not have a properly formatted currently valid User Domain Authorization for the SCE-conformant DRM Agent readily available, it may indicate within its response that an RO cannot be issued until such situation is rectified. The presence of a top-level <userDomain> constraint in a targeted User Domain RO may serve to indicate to a v2.x DRM Agent that the User Domain RO is not meant for its use.

Initially, and as indicated at step 202, the SCE-conformant DRM Agent is validated to, for instance, prove that the SCE-conformant DRM Agent has properly joined the User Domain. More particularly, for instance, when the SCE-conformant DRM Agent joined the User Domain, the SCE-conformant DRM Agent received an attribute certificate from the DEA 24 in the form of a User Domain Authorization as described herein immediately above. In addition, during the User Domain RO request process, the SCE-conformant DRM Agent communicates the attribute certificate to the LRM/downstream RI 22 and the LRM/downstream RI 22 stores that attribute certificate. At step 202, the SCE-conformant DRM Agent essentially proves to the LRM/downstream RI 22 delivering the User Domain RO that the SCE-conformant Agent is in the User Domain. The SCE-conformant DRM Agent may request a User Domain RO without including a User Domain Authorization. In addition, the LRM/Downstream RI 22 does not require a User Domain Authorization of the DRM Agent if the RO is generated as a backwards-compatible User Domain RO. Moreover, the LRM/downstream RI 22 may generate a targeted User Domain RO without an explicit request from the SCE-conformant DRM Agent. Furthermore, the LRM/Downstream RI 22 may determine the SCE-conformant aspect of the DRM Agent by means of verifying that the certificate of the DRM Agent includes an sceDrmAgent key purpose (as well as a drmAgent key purpose).

The LRM/downstream RI 22 may also be able to determine that the SCE-conformant DRM Agent is in the User Domain if the LRM/downstream RI 22 previously responded to a User Domain RO request from the SCE-conformant DRM Agent that included a valid User Domain Authorization for the DRM Agent. Such request may have resulted in generation by the LRM/downstream RI 22 of a targeted User Domain RO communicated to that DRM Agent. Such request may have alternatively resulted in generation by the LRM/downstream RI 22 of a backwards-compatible User Domain RO communicated directly or in an out-of-band manner to the DRM Agent. However, if a relationship between the LRM/downstream RI 22 and the DRM Agent was not formed, the SCE-conformant DRM Agent must prove to the LRM/downstream RI 22 that it has a current User Domain Authorization. If the SCE-conformant DRM Agent does not have a current User Domain Authorization, the LRM/downstream RI 22 will reject a request for the RO from that DRM Agent unless the LRM/downstream RI 22 generates a backwards-compatible User Domain RO. A request for a backwards-compatible User Domain RO does not require a User Domain Authorization corresponding to the requesting DRM Agent and may be made by a v2.x DRM Agent or an SCE-conformant DRM Agent. A backwards-compatible User Domain RO may be generated and safely released because it cannot be cryptographically accessed without knowledge of the UDK.

At step 206, the LRM/downstream RI 22 generates a targeted User Domain RO for the SCE-conformant DRM Agent without using a User Domain Key. Instead, the LRM/downstream RI 22 generates the targeted User Domain RO based upon mutual attribute certificates, which are also called User Domain Authorizations. The LRM/downstream RI 22 may store and reuse the User Domain Authorizations as needed for the targeted User Domain ROs. Although the LRM/downstream RI 22 may receive the REK and encrypted REK information from the DEA 24 and may use the REK to generate backwards-compatible User Domain ROs as discussed above with respect to steps 106 and 108 in FIG. 3, this process is not used for generation of targeted (i.e. <userDomain>-constrained) User Domain ROs.

Instead, the process of requesting and receiving User Domain ROs is based on the standard RO acquisition protocol together with an overlay of User Domain Authorizations, where the construction of a backwards-compatible User Domain RO is similar to the construction of a v2.x Domain RO (and appears to be a v2.x Domain RO to a v2.x Device if generated by an RI 22 or an LRM 22 with rightsIssuer key purpose) whereas the construction of a targeted User Domain RO is similar to the construction of a v2.x Device RO. The encryption of the REK in a Device RO or in a targeted User Domain RO is based on use of the targeted DRM Agent's certified public key rather than on use of a Domain Key or UDK. In a backwards-compatible User Domain RO, according to an embodiment, there is no explicit use made of a UDK by the downstream RI/LRM 22 that does not have knowledge of the UDK. However, there is implicit use because the (AES-Wrap) encryption of REK (concatenated with $K_{MAC}$) under the UDK is incorporated into the RO. To cryptographically access a backwards-compatible User Domain RO, a v2.x DRM Agent or SCE-conformant DRM Agent uses its knowledge of UDK, whereas to cryptographically access a targeted User Domain RO, the SCE-conformant DRM Agent uses its knowledge of its own private key that corresponds to its certified public key.

Generally speaking, the targeted User Domain RO generated by the LRM/downstream RI 22 is similar to a Device RO. One result of this similarity is that the target SCE-conformant DRM Agent will be unable to move the User Domain RO outside of the User Domain. Instead, the User Domain RO will only be allowed to move within the User Domain because the User Domain RO is associated with a User Domain that is locked in by the LRM/downstream RI 22 under this signature.

In any regard, at step 208, the LRM/downstream RI 22 that generated the targeted User Domain RO communicates the targeted User Domain RO to the SCE-conformant DRM Agent.

As discussed above, the LRM/downstream RI 22 may generate a targeted User Domain RO for a specific SCE-conformant DRM Agent. In various instances, the targeted User Domain RO may be "moved" from a source SCE-conformant DRM Agent, which may comprise the initially targeted SCE-conformant DRM Agent, to a sink SCE-conformant DRM Agent. According to an embodiment, a downstream RI 22 may perform the move from the source SCE-conformant DRM Agent to the sink SCE-conformant DRM Agent. This RI-assisted move may be done in an asynchronous fashion, in that, as part of the request by the source SCE-conformant DRM Agent to the RI 22, the source SCE-conformant DRM Agent may identify the intended sink SCE-conformant DRM Agent (or leave that determination to the assisting RI), but following receipt of the response from the RI, the source SCE-conformant DRM Agent is no longer involved. Based on the response from the RI, the source SCE-conformant DRM Agent may determine whether or not it can continue to use the rights, i.e., whether or not the RI intends to deliver a targeted User Domain RO corresponding to those rights to a sink SCE-conformant DRM Agent. The source SCE-conformant DRM Agent may kill the rights for which it requested a move corresponding to the User Domain RO stored thereon if the response from the RI 22 indicated success.

The sink or recipient SCE-conformant DRM Agent may be triggered by the RI to request the targeted User Domain RO that the RI generated based at least in part on the information supplied by the source SCE-conformant DRM Agent. Within the RO acquisition protocol response, the RI 22 may indicate to the sink or recipient SCE-conformant DRM Agent that the User Domain RO in the response is a targeted User Domain RO resulting from a move requested by a source SCE-conformant DRM Agent (without necessarily identifying the source SCE-conformant DRM Agent). This indicates to the sink DRM Agent that the RO is to be processed as a targeted User Domain RO resulting from a move rather than as an originally or initially issued targeted User Domain RO. Although the assisting RI 22 must be associated with the particular User Domain, the generation and delivery of the targeted User Domain RO by the assisting RI 22 differs in significant ways from the generation and delivery of the original or initial targeted User Domain RO. For instance, the REK is not generated by the assisting RI 22, but rather is received in encrypted form based on application of UDK as part of the request from the source SCE-conformant DRM Agent, and is not decrypted prior to being encrypted at the RI 22 by applying the sink SCE-conformant DRM Agent's certified public key.

Consequently, recovery of the REK from the targeted Rights Object delivered to the sink SCE-conformant DRM Agent requires knowledge of UDK as well as of the SCE-conformant DRM Agent's private key. Thus, unlike the case of delivery of the original targeted User Domain RO the sink SCE-conformant DRM Agent is not required to be a member of the User Domain at the time of delivery and therefore need not supply a User Domain Authorization to the RI 22 that represents such membership. This aspect parallels the situation of distribution of backwards-compatible User Domain ROs, although unlike that case, the RO is targeted to a specific DRM Agent. The assisting RI not only need not recover the REK, but also, even if rogue, cannot feasibly independently recover REK without knowledge of UDK. The assisting RI, even if rogue, cannot convert the RO to a backwards-compatible User Domain RO usable by v2.x DRM Agents. Furthermore, not every RI associated with the User Domain, even if rogue, can necessarily successfully perform the function of assisting in move of a targeted User Domain RO corresponding to that User Domain, as discussed further herein below.

Typically, the source DRM Agent is presumed to have registered with the RI and to have thus established an RI Context with the RI prior to requesting move of an RO. If the RI Context indicates that the RI has stored relevant information about the DRM Agent's certificate, it may be unnecessary for the DRM Agent to include its identity certificate information in the move targeted User Domain RO request it sends to the RI as source DRM Agent. Similarly, typically, the sink DRM Agent is presumed to have registered with the RI and to have thus established an RI Context with the RI prior to requesting acquisition of an RO. If the RI Context indicates that the RI has stored relevant information about the DRM Agent's certificate, it may be unnecessary for the DRM Agent to include its identity certificate information in the RO acquisition protocol request it sends to the RI.

The downstream RI 22 may comprise the RI that initially targeted the User Domain RO that is to be moved or the targeted User Domain RO may have been initially targeted by a different downstream RI 22 or by an LRM 22. In any event, and as discussed in greater detail herein below, the downstream RI 22 is configured to preserve the intent of the original issuer of the RO without reliance on the "transitive trust" model. The "transitive trust" model basically indicates that when a User Domain RO is moved at different times by different RIs, since the RI currently considering assisting in the move has visibility to only the last RI 22 that moved the RO (or to the original LRM/RI 22 creator of the RO), it needs to trust not only that RI for its processing of the RO, but also implicitly trust that RI's judgment in trusting the RI that moved it immediately previously (or the original creator RI/LRM), and so on, without necessarily having independently verifiable knowledge of the list of RIs that the original creator LRM/RI intended to permit to assist in later moving the RO or even of the identity of the original creator LRM/RI. Although the original creator LRM/RI can include such indication in the original RO, any rogue RI along the way can successfully alter such indication unless the precautionary measures described herein below are taken.

According to an embodiment, the need for an RI that assists in an RI-mediated DRM Agent to DRM Agent move of a User Domain RO to implicitly trust other RIs that engage in these moves without having first-hand knowledge of their identities is removed. This need is removed by means of ensuring that any modification of a list of eligible ones of the RIs as intended by the RI or LRM that created the initial User Domain RO and/or modification of the identity of the RI or LRM that created the initial User Domain RO will result in the RO that is transferred to the sink SCE-conformant DRM Agent as being unusable unless there is collusion between a compromised source DRM Agent and a rogue RI, as discussed in greater detail herein below.

Figure 5:
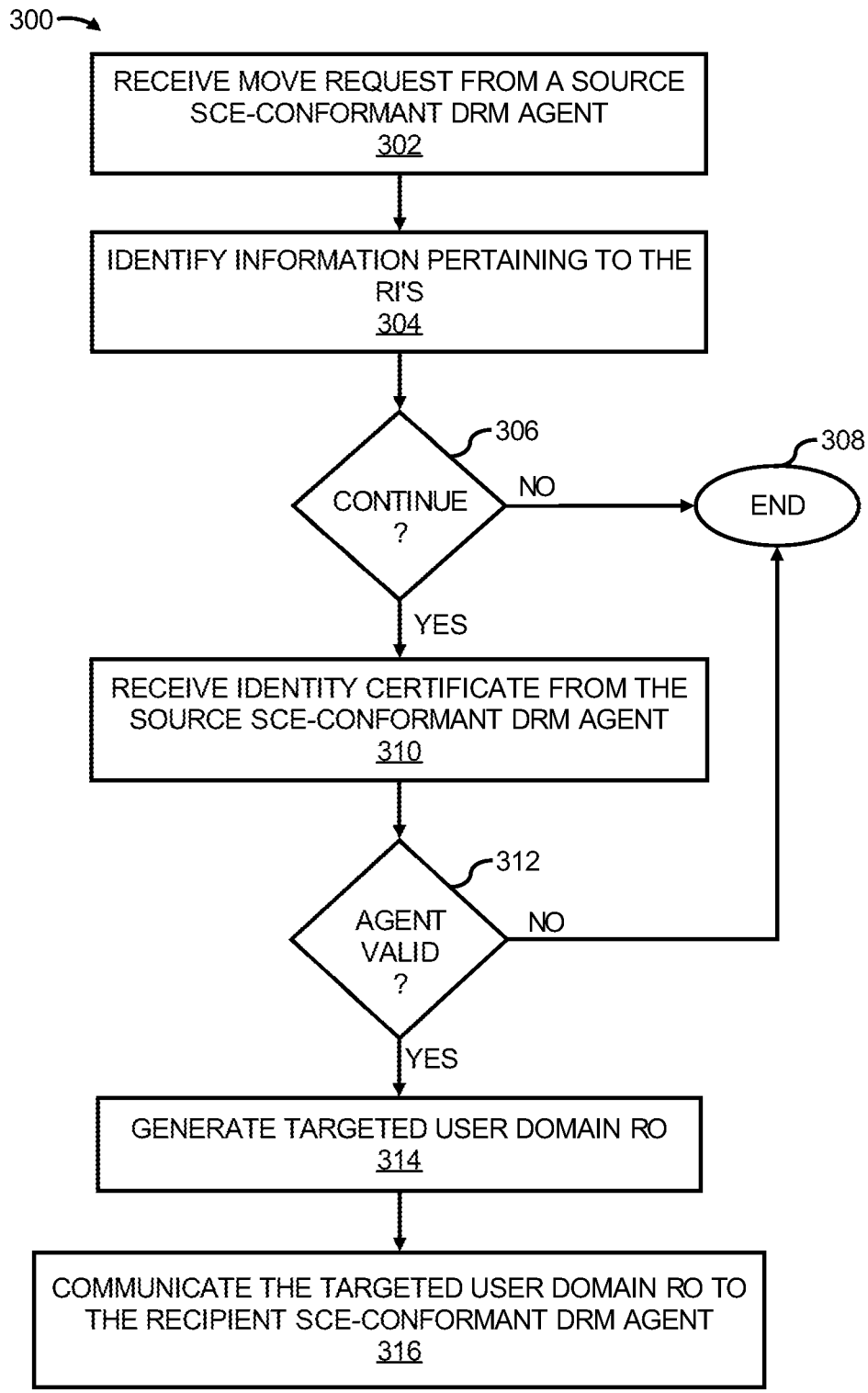
FIG. 5 depicts a flow diagram of a method of moving a User Domain RO from a source SCE-conformant DRM Agent to a recipient SCE-conformant DRM Agent through operation of a Rights Issuer, according an embodiment of the invention.

Turning now to FIG. 5, there is shown a flow diagram 300 of a method of moving a User Domain RO from a source SCE-conformant DRM Agent to a recipient SCE-conformant DRM Agent through operation of a downstream RI 22, according to an embodiment of the invention. It should be understood that the method 300 depicted in FIG. 5 may include additional steps and that some of the steps described herein may be removed and/or modified without departing from a scope of the method 300.

At step 302, a downstream RI 22 receives a request to move a User Domain RO from a source SCE-conformant DRM Agent to a sink SCE-conformant DRM Agent. According to an example, the downstream RI 22 receives the request from the source SCE-conformant DRM Agent. In addition, the requested User Domain RO to be moved may have been generated as discussed above with respect to the method 200 in FIG. 4. Moreover, the requested User Domain RO to be moved may have initially been targeted for the source SCE-conformant DRM Agent or the source SCE-conformant DRM Agent may have received the User Domain RO directly from another SCE-conformant DRM Agent as discussed herein below under Agent to Agent moves. The requested User Domain RO to be moved may have been targeted for the source SCE-conformant DRM Agent by the originator RI/LRM 22 or may have been moved to the source SCE-conformant DRM Agent by an assisting or mediating downstream RI 22.

At step 304, the downstream RI 22 can reliably determine the list of RIs that the originating LRM or RI 22 intended to allow to later move the RO and possibly also determine the identity of the originating LRM or RI if such information had been included. Based on this determination, at step 306, the RI 22 may make a decision as to whether or not it wants to proceed with processing the request to move the RO. If the RI 22 does not trust one or more of the originating LRM or RI 22 or an RI that was originally allowed to move the RO, the method 300 may end as indicated at step 308.

If the RI trusts the other LRM or RI's or determines that the method 300 is to continue at step 306, the RI may receive the identity certificate of the source SCE-conformant DRM Agent as indicated at step 310. Verification of the validity of the request to move the RO is based in part on accessing the information in or derived from the identity certificate of the source DRM Agent, including, in particular, the public key of the source SCE-conformant DRM Agent and the fact that it is an SCE-conformant DRM Agent based on presence of sceDrmAgent key purpose. In addition, as indicated at step 312, the downstream RI 22 determines whether the source SCE-conformant DRM Agent is valid to substantially ensure that the source SCE-conformant DRM Agent has properly joined the User Domain. More particularly, for instance, when the source SCE-conformant DRM Agent joined the User Domain via the DEA 24, the source SCE-conformant DRM Agent received the attribute certificate or User Domain Authorization from the DEA 24. At steps 310 and 312, the source SCE-conformant DRM Agent essentially proves to the downstream RI 22 delivering the User Domain RO that the SCE-conformant Agent is in the User Domain. Alternatively, the RI 22 may have prior knowledge of a still-valid User Domain Authorization for the particular SCE-conformant DRM Agent.

If the source SCE-conformant DRM Agent has not joined the User Domain or has failed to prove such an association, the downstream RI 22 may return a status indicating error within the response message to the SCE-conformant DRM Agent indicating that the move has been aborted, i.e., that the RI 22 will not generate a targeted User Domain RO for a sink SCE-conformant DRM Agent and that the source SCE-conformant DRM Agent can continue to use the rights corresponding to the RO referred to in the request, as indicated at step 308.

At step 314, the downstream RI 22 generates a targeted User Domain RO for the sink or recipient SCE-conformant DRM Agent using the information in or derived from the identity certificate of the recipient SCE-conformant DRM Agent. In addition, the downstream RI 22 generates the targeted User Domain RO for the recipient SCE-conformant DRM Agent without using a User Domain Key, as discussed above with respect to the method 200 in FIG. 4. In other words, the downstream RI 22 is not given access to the actual REK(s). Instead, the source SCE-conformant DRM Agent must receive the correct value(s) of "PREK" in order for the RO acquisition protocol via the downstream RI 22 to result in the recipient SCE-conformant DRM Agent accessing the correct REK(s) once that recipient SCE-conformant DRM Agent is a member of the User Domain. In particular, the signature on the request message from the source SCE-conformant DRM Agent must have been generated by the entity identified within the User Domain Authorization that is within the part of the request that is MAC'd (to provide key confirmation), where this MAC key and the PREK(s) are transmitted within the move request from the source SCE-conformant DRM Agent in a form that requires access to the RI's private key in order to perform recovery.

As such, when creating the User Domain RO for the recipient SCE-conformant DRM Agent, rather than generating a new REK as done in the case of initial or original generation of a targeted User Domain RO and using that REK to encrypt (e.g., AES-Wrap) one or more content encryption keys (CEK) that are used to encrypt or decrypt the content, the downstream RI 22 includes the PREK(s) in the ROs it generates, where the RI recovered such PREK(s) from the move request message from the source SCE-conformant DRM Agent based on knowledge of the RI's private key, and includes in the RO the information that the source SCE-conformant DRM Agent sent it that presumably corresponds to the (e.g., AES-Wrap) encryption of the CEK(s) under the REK. Thus, unlike the original or initial generation of a targeted User Domain RO or backwards-compatible User Domain RO, the RI 22 need not have knowledge of REK. In other words, the downstream RI 22 generates the targeted User Domain RO based upon the public key contained in the identity certificate of the recipient SCE-Conformant DRM Agent.

In any regard, at step 316, the downstream RI 22 communicates the targeted User Domain RO to the sink or recipient SCE-conformant DRM Agent. The recipient SCE-conformant DRM Agent uses its knowledge of its private key to recover PREK. Since the subsequent recovery of the REK from PREK requires knowledge of the UDK, the recipient SCE-conformant DRM Agent must be a member of the User Domain to fully process the RO in order to enable useful access to the corresponding content, but need not be in the User Domain at the time the recipient SCE-conformant DRM Agent receives the targeted User Domain RO nor prove its membership in the User Domain to the RI in order to receive the RO. The recipient SCE-conformant DRM Agent should verify the inclusion of the ID of the RI in the list of RIs eligible to assist in move of the targeted User Domain RO. The list of RIs eligible to assist in move, together with possibly other information such as the identity of the originating RI/LRM can be in the form of a <moveIndication> element. If PREK has been modified independently of the <moveIndication> element in the RO, recovery of REK will fail. The <moveIndication> element is part of the information that is signed by the RI 22, where the signing key is private to the RI. Effective modification of PREK requires knowledge of UDK which is not given to the RI.

As an example formulation of PREK: Let Hash16 denote the first 16 bytes of the SHA-1 hash of the <moveIndication> element. REK is first XORed with Hash16 and the result is then wrapped with the UDK using the AES-WRAP symmetric wrapping scheme. Let PREK denote the protected REK: PREK=AES-WRAP(UDK, REK XOR Hash16).

In contrast to the method 300 depicted in FIG. 5, there are instances where a direct moving or copying of a User Domain RO from a source SCE-conformant DRM Agent to a recipient SCE-conformant DRM Agent is desired. These instances may occur, for example, when the SCE-conformant DRM Agents do not have access to an RI 22 that is permitted and willing to perform the move or RI-assisted Move is not enabled in the source SCE-conformant DRM Agent and/or recipient SCE-conformant DRM Agent. A User Domain RO that is moved or copied in the method described herein below is assumed to have begun its lifecycle as a targeted (i.e., <userDomain>-constrained) RO. However, the source SCE-conformant DRM Agent is not necessarily the original or initial recipient of the targeted RO from a downstream RI/LRM 22. The source SCE-conformant DRM Agent may have alternatively received the RO directly from another SCE-conformant DRM Agent or as the result of an RI-assisted move. Prior to onset of the move or copy method described below herein, it may be assumed that the two SCE-conformant DRM Agents have established a Secure Authenticated Channel (SAC) using standard means based, in particular, on exchange of their identity certificates. The SAC may be used to protect the integrity and confidentiality of the communications as needed. In particular, the confidentiality aspect ensures that the targeting of the RO from the source DRM Agent to the recipient DRM Agent is maintained, in that an eavesdropper even with knowledge of the UDK will not be able to recover the REK.

The source SCE-conformant DRM Agent must be in the User Domain at the time the User Domain RO is moved or copied to the SCE-conformant DRM Agent. However, the recipient SCE-conformant DRM Agent need not be a member of the User Domain at the time of the move or copy of the User Domain RO from the source SCE-conformant DRM Agent.

Figure 6:
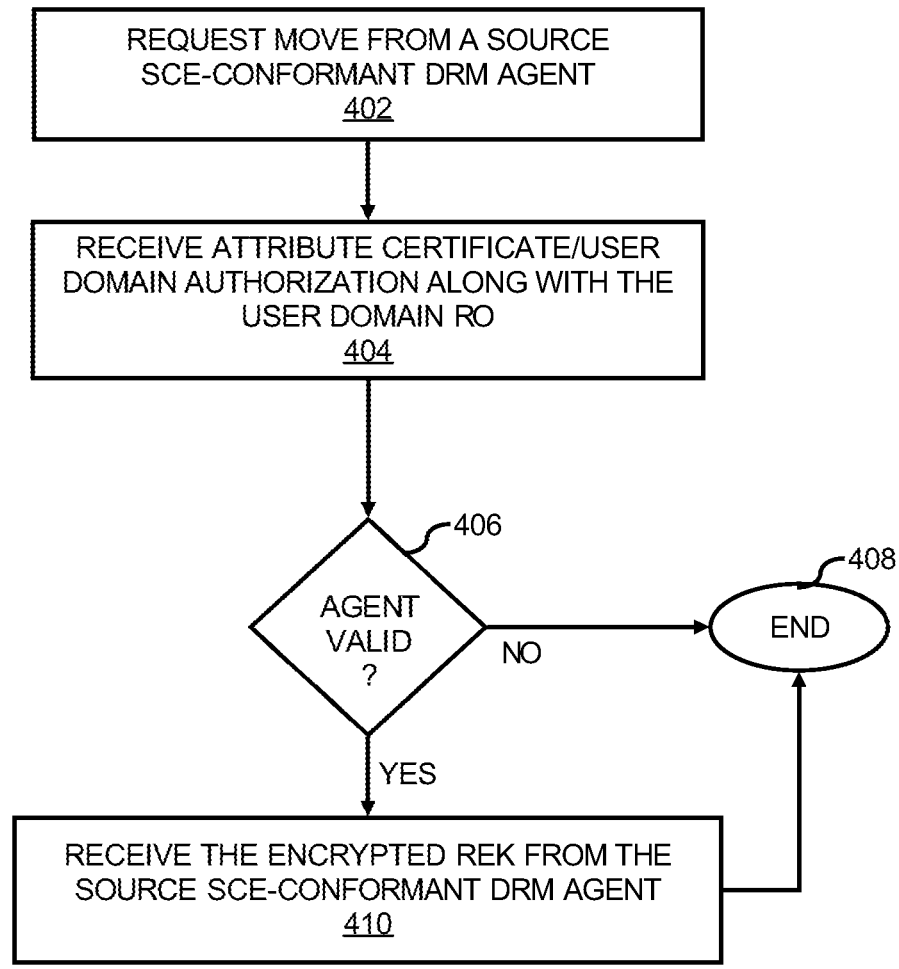
FIG. 6 depicts a flow diagram of a method of directly moving a User Domain RO from a source SCE-conformant DRM Agent to a recipient SCE-conformant DRM Agent, according to an embodiment of the invention.

Turning now to FIG. 6, there is shown a flow diagram 400 of a method of directly moving a User Domain RO from a source SCE-conformant DRM Agent to a recipient SCE-conformant DRM Agent, according to an embodiment of the invention. It should be understood that the method 400 depicted in FIG. 6 may include additional steps and that some of the steps described herein may be removed and/or modified without departing from a scope of the method 400.

At step 402, the recipient SCE-conformant DRM Agent requests that a User Domain RO be moved from a source SCE-conformant DRM Agent. In addition, the recipient SCE-conformant DRM Agent receives an attribute certificate or User Domain Authorization of the source SCE-conformant DRM Agent and the User Domain RO, as indicated at step 404. Alternatively the source SCE-conformant DRM Agent pushes the User Domain RO to the recipient SCE-conformant DRM Agent along with the source SCE-conformant DRM Agent's User Domain Authorization in step 404 without step 402. Even if known to the source SCE-conformant DRM Agent, the original targeted User Domain RO need not necessarily be transmitted in its entirety across the channel between the source SCE-conformant DRM Agent and recipient SCE-conformant DRM Agent since the information specific to the original recipient SCE-conformant DRM Agent is not necessarily of use to the recipient DRM Agent. The protection of sensitive information may be done via the SAC rather than by encrypting using the recipient SCE-conformant DRM Agent's certified public key and/or using digital signatures.

At step 406, the recipient SCE-conformant DRM Agent determines whether the source SCE-conformation DRM Agent is a valid member of the User Domain. According to an embodiment, the recipient SCE-conformant DRM Agent makes this determination through a comparison of the information contained in the data sent along with the part of the User Domain RO that is communicated and the information that had been embedded in the User Domain RO by the RI or LRM that initially or last generated the User Domain RO. More particularly, for instance, the recipient SCE-conformant DRM Agent may compare the fields of the User Domain Authorization of the RI or LRM that initially or last generated the User Domain RO against the corresponding fields of the User Domain Authorization of the source SCE-conformant DRM Agent sent over the channel from the source SCE-conformant DRM Agent to the recipient SCE-conformant DRM Agent. In addition, the recipient SCE-conformant DRM Agent is not required to be a member of the User Domain to make this determination.

In determining whether the source SCE-conformant DRM Agent is valid at step 406, the recipient SCE-conformant DRM Agent is configured to perform is a number of additional checks. These additional checks may include, for instance, a determination as to whether the source SCE-conformant DRM Agent is using an earlier generation of the User Domain Key than that known to the recipient SCE-conformant DRM Agent, in the case that the recipient SCE-conformant DRM Agent is already a member of the User Domain. If the protocol is configured so that the source SCE-conformant DRM Agent explicitly sends its User Domain Authorization (within the UserDomainAuthorization field), then the REK can be sent AES-Wrapped under the UDK (as received in step 410 below) without the need for other means such as herein below for the recipient SCE-conformant DRM Agent to ascertain whether or not the source SCE-conformant DRM Agent has knowledge of a legitimately recent generation of the UDK.

As an alternative to the source SCE-conformant DRM Agent providing an explicit User Domain Authorization, according to an embodiment, this check may be made by adding (via exclusive-or) a value (namely a truncated one-way hash of the recipient device ID) to REK, such that the incorrect value of REK is recovered by the recipient SCE-conformant DRM Agent if the source Device does not provide the correct sum as input to AES-WRAP under the User Domain Key. Even a recipient SCE-conformant DRM Agent, for instance, Device A, that acquires knowledge (by decrypting using the security association of the Secure Authenticated Channel) of AES-WRAP(UDK, REK XOR Trunc(Hash(ID of Device A)), cannot convert this to AES-WRAP(UDK, REK XOR Trunc(Hash(ID of Device B)) for some other Device B not equal to Device A without first acquiring knowledge of UDK by joining the domain. If this configuration is used, this value is sent in place of AES-WRAP(UDK, REK) as described above during step 410.

If any of the checks indicates that the source SCE-conformant DRM is Agent is invalid or may otherwise be unauthorized to perform the move or copy of the User Domain RO, the recipient SCE-conformant DRM Agent may end the method 400 as indicated at step 408.

If, however, the recipient SCE-conformant DRM Agent determines that the information the source SCE-conformant DRM Agent had sent is valid at step 406, it can respond to this effect and accept receipt in step 410 of the encrypted REK value. Once the encrypted REK value has been sent by the source SCE-conformant DRM Agent, the source SCE-conformant DRM Agent cannot necessarily safely abort the move. Whether or not the recipient SCE-conformant DRM Agent acknowledges successful or unsuccessful receipt of the encrypted REK value, there is a possibility that this acknowledgement is not received intact by the source SCE-conformant DRM Agent. A copy operation can be done in two passes even if move is done in four passes, since recovery from communications failure may be less of an issue for copy. Thus the encrypted REK can be sent in the first pass, where if the acknowledgement from the recipient DRM Agent indicates failure but passes the SAC integrity check, the copy operation can be safely aborted.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 7:
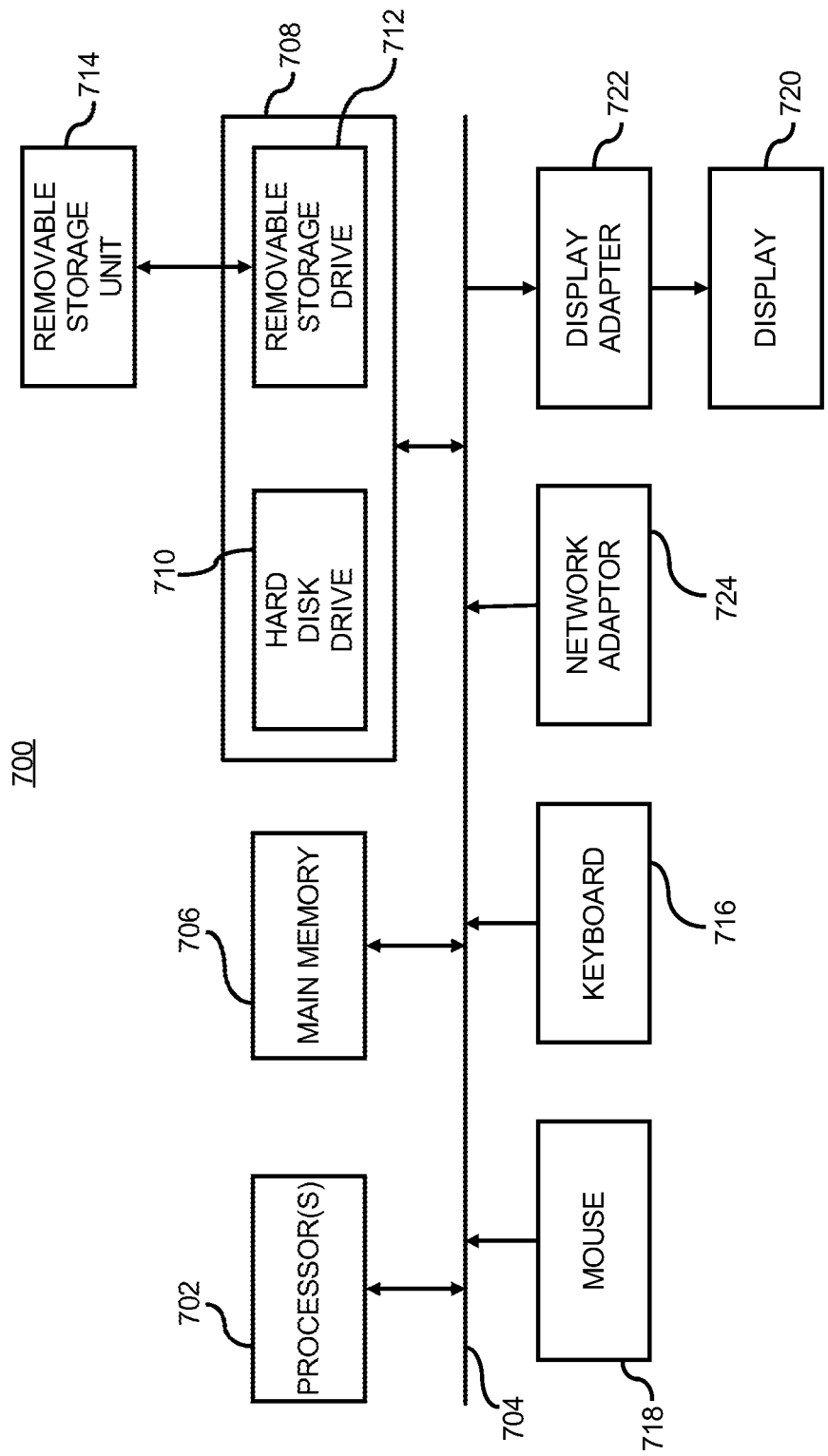
FIG. 7 shows a block diagram of a computing apparatus configured to implement or execute one or more of the processes depicted in FIGS. 3-6.

FIG. 7 illustrates a block diagram of a computing apparatus 700 configured to implement or execute one or more of the processes depicted in FIGS. 3-6, according to an embodiment. It should be understood that the illustration of the computing apparatus 700 is a generalized illustration and that the computing apparatus 700 may include additional components and that some of the components described may be removed and/or modified without departing from a scope of the computing apparatus 700.

The computing apparatus 700 includes a processor 702 that may implement or execute some or all of the steps described in one or more of the processes depicted in FIGS. 3-6. Commands and data from the processor 702 are communicated over a communication bus 704. The computing apparatus 700 also includes a main memory 706, such as a random access memory (RAM), where the program code for the processor 702, may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for one or more of the processes depicted in FIGS. 2-6 may be stored.

The removable storage drive 710 reads from and/or writes to a removable storage unit 714 in a well-known manner. User input and output devices may include a keyboard 716, a mouse 718, and a display 720. A display adaptor 722 may interface with the communication bus 704 and the display 720 and may receive display data from the processor 702 and convert the display data into display commands for the display 720. In addition, the processor(s) 702 may communicate over a network, for instance, the Internet, LAN, etc., through a network adaptor 724.

It will be apparent to one of ordinary skill in the art that other known electronic components may be added or substituted in the computing apparatus 700. It should also be apparent that one or more of the components depicted in FIG. 7 may be optional (for instance, user input devices, secondary memory, etc.).

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method, comprising:
receiving, in one of a rights issuer (RI) or a local rights manager (LRM), a rights object encryption key (REK) and an encrypted REK from an entity, wherein the entity generates the REK and, to facilitate maintaining security with regard to a user domain key, the one of the RI or the LRM is not permitted access to the user domain key; and
based at least in part on the REK, generating a user domain rights object (RO) that includes a user domain authorization and the encrypted REK, wherein the user domain authorization identifies a user domain and the one of the RI or the LRM, the user domain authorization is associated with the user domain and the user domain key, the encrypted REK is derived from the REK by using the user domain key, and the generated user domain rights object is communicated to a device via one of a SCE-conformant DRM Agent, an RO acquisition protocol, and an out-of-band manner.

2. The method of claim 1, wherein the entity is a domain enforcement agent (DEA) and wherein the user domain authorization includes a digital signature generated by the DEA.

3. The method of claim 2, further comprising generating, by the DEA, a set of keys, comprising a message authentication code key, the REK used when generating the user domain RO, a key wrap using the user domain key and relating to the message authentication code key and the REK used when generating the user domain RO, a message authentication code key-leave, or a key wrap using the user domain key and relating to the message authentication code key-leave.

4. The method of claim 3, further comprising encrypting at least one of the message authentication code key, the REK used when generating the user domain RO, the key wrap using the user domain key and relating to the message authentication code key and the REK used when generating the user domain RO, the message authentication code key-leave, or the key wrap using the user domain key and relating to the message authentication code key-leave in the set of keys using a security association that was established as part of a registration of the one of the RI or the LRM with the DEA as a prerequisite to becoming associated with the user domain and generating the user domain RO.

5. The method of claim 2, wherein the user domain authorization is associated with the user domain and the user domain key, and wherein the DEA does not communicate the user domain key to the one of the RI or the LRM.

6. The method of claim 1, wherein the LRM has a certificate with an RI key purpose.

7. The method of claim 1, wherein a device that consumes content in accordance with the user domain RO comprises one of a legacy DRM agent or an SCE-conformant DRM agent.

8. The method of claim 1, further comprising:
in the one of the RI or the LRM, receiving matched plain and ciphertext prior to using the REK to generate the user domain RO that includes the user domain authorization and the encrypted REK.

9. A system, comprising:
a memory that stores computer-executable components; and
a processor that executes at least the following computer-executable components stored in the memory:
one of a rights issuer (RI) component or a local rights manager (LRM) component configured to obtain a rights object encryption key (REK) and an encrypted REK from an entity, wherein the entity generates the REK and one of the RI component or the LRM component is further configured to create a user domain rights object (RO) that comprises a user domain authorization and the encrypted REK, wherein the user domain authorization facilitates identification of a user domain and the one of the RI component or the LRM component, the user domain authorization is associated with the user domain and a user domain key, the encrypted REK is derived from the REK by using the user domain key, the generated user domain rights object is communicated to a device via one of a SCE-conformant DRM Agent, an RO acquisition protocol, and an out-of-band manner, and, to facilitate security with regard to the user domain key, the one of the RI component or the LRM component is not provided access to the user domain key.

10. The system of claim 9, wherein the entity is a domain enforcement agent (DEA) and wherein the user domain authorization comprises a digital signature generated by the DEA.

11. The system of claim 10, wherein the DEA generates at least one of a set of keys, comprising a message authentication code key, the REK used when generating the user domain RO, a key wrap using the user domain key and relating to the message authentication code key and the REK used when generating the user domain RO, a message authentication code key-leave, or a key wrap using the user domain key and relating to the message authentication code key-leave.

12. The system of claim 11, wherein at least one of the message authentication code key, the REK used when generating the user domain RO, the key wrap using the user domain key and relating to the message authentication code key and the REK used when generating the user domain RO, the message authentication code key-leave, or the key wrap using the user domain key and relating to the message authentication code key-leave in the set of keys is encrypted using a security association that was established as part of a registration of the one of the RI component or the LRM component with the DEA as a prerequisite to becoming associated with the user domain and generating the user domain RO.

13. The system of claim 10, wherein the user domain authorization is associated with the user domain and the user domain key, and wherein the DEA does not transmit the user domain key to the one of the RI component or the LRM component.

14. The system of claim 9, wherein the LRM component is associated with a certificate with an RI key purpose.

15. The system of claim 9, wherein the one of the RI component or the LRM component is further configured to receive matched plain and ciphertext from the entity prior to using the REK to generate the user domain RO.

16. A non-transitory computer-readable storage device comprising computer-executable instructions that, in response to execution, cause a system comprising a processor to perform operations, comprising:
receiving, in one of a rights issuer (RI) or a local rights manager (LRM), a rights object encryption key (REK) and an encrypted REK from an entity, wherein the entity generates the REK and, to facilitate security with regard to a user domain key, the one of the RI or the LRM is not permitted access to the user domain key; and based at least in part on the REK, generating a user domain rights object (RO) that includes a user domain authorization and the encrypted REK, wherein the user domain authorization identifies a user domain and the one of the RI or the LRM, the user domain authorization is associated with the user domain and the user domain key, the encrypted REK is derived from the REK by using the user domain key, and the generated user domain rights object is communicated to a device via one of a SCE-conformant DRM Agent, an RO acquisition protocol, and an out-of-band manner.

17. The computer-readable storage device of claim 16, wherein the entity is a domain enforcement agent (DEA) and wherein the user domain authorization includes a digital signature generated by the DEA.

\* \* \* \* \*